(12) United States Patent
Gallaway et al.

(10) Patent No.: US 11,062,529 B2
(45) Date of Patent: Jul. 13, 2021

(54) ARCHITECTURES FOR VEHICLE TOLLING

(71) Applicant: Raytheon Company, Waltham, MA (US)

(72) Inventors: Jacob W. Gallaway, Allen, TX (US); Nathan D. Davis, Richardson, TX (US); Jeremy J. Gerhart, Dallas, TX (US)

(73) Assignee: Raytheon Company, Waltham, MA (US)

( * ) Notice: Subject to any disclaimer, the term of this patent is extended or adjusted under 35 U.S.C. 154(b) by 87 days.

(21) Appl. No.: 16/437,315

(22) Filed: Jun. 11, 2019

(65) Prior Publication Data
US 2019/0378347 A1 Dec. 12, 2019

Related U.S. Application Data

(60) Provisional application No. 62/683,413, filed on Jun. 11, 2018.

(51) Int. Cl.
*G07B 15/06* (2011.01)
*G06K 9/32* (2006.01)
(Continued)

(52) U.S. Cl.
CPC ............. *G07B 15/06* (2013.01); *G06K 9/325* (2013.01); *G06N 3/08* (2013.01); *G06Q 20/102* (2013.01); *G08G 1/015* (2013.01); *G08G 1/0175* (2013.01)

(58) Field of Classification Search
CPC .......... G07B 15/06; G06K 9/325; G06N 3/08; G06Q 20/102; G08G 1/015; G08G 1/0175
See application file for complete search history.

(56) References Cited

U.S. PATENT DOCUMENTS 6,195,019 B1    2/2001  Nagura
8,331,621 B1 *  12/2012 Allen ................ G08G 1/015
                                          382/104
(Continued)

FOREIGN PATENT DOCUMENTS

CN        105354273 A     2/2016
WO     WO-2019241224 A1  12/2019

OTHER PUBLICATIONS

Anton Grigoryev,"Building a robust vehicle detection and classification module" (Year: 2015).*
(Continued)

*Primary Examiner* — Dhaval V Patel
(74) *Attorney, Agent, or Firm* — Schwegman Lundberg & Woessner, P.A.

(57) ABSTRACT

Generally discussed herein are systems, devices, and methods for improved automatic toll generation. A system can include one or more cameras positioned to capture images of vehicles passing through a toll station, vehicle detection and classification circuitry to receive an image of a vehicle from the one or more cameras and execute a first machine learning (ML) model to classify the vehicle, axle count circuitry to, in response to receiving data from the vehicle detection and classification circuitry that a vehicle was detected, execute a second ML model to classify a number of axles of the vehicle for determining a toll charge, and toll circuitry to issue the toll charge based on the classified number of axles.

20 Claims, 7 Drawing Sheets

(51) Int. Cl.
   *G06N 3/08* (2006.01)
   *G06Q 20/10* (2012.01)
   *G08G 1/015* (2006.01)
   *G08G 1/017* (2006.01)

(56) References Cited

U.S. PATENT DOCUMENTS

| | | | |
|---|---|---|---|
| 10,019,640 B2* | 7/2018 | Almeida | G06K 9/325 |
| 2003/0042303 A1* | 3/2003 | Tsikos | G06K 9/325 |
| | | | 235/384 |
| 2009/0174575 A1 | 7/2009 | Allen et al. | |

OTHER PUBLICATIONS

Hui Lin, "Reading car license plates using deep convolution networks and LSTM" (Year: 2016).*

"International Application Serial No. PCT/US2019/036517, International Search Report dated Aug. 21, 2019", 4 pgs.

"International Application Serial No. PCT/US2019/036517, Written Opinion dated Aug. 21, 2019", 5 pgs.

"International Application Serial No. PCT/US2019/036517, International Preliminary Report on Patentability dated Dec. 24, 2020", 7 pgs.

* cited by examiner

ARCHITECTURES FOR VEHICLE TOLLING

RELATED APPLICATION

This application claims the benefit of priority to U.S. Provisional Patent Application Ser. No. 62/683,413, filed on Jun. 11, 2018, and titled "Solution for Vehicle Identification, Classification and Tracking Using Convolutional Neural Networks for Automated Tolling" which is incorporated herein by reference in its entirety.

TECHNICAL FIELD

Some embodiments described herein generally relate to using machine learning (ML) models and cameras for vehicle tolling.

BACKGROUND

Current toll systems rely on axle sensors that are embedded in a roadway on which cars are travelling. The output of the axle sensors can be used to count the number of vehicles that have travelled the roadway. The output of the axle sensors can be used to inform a toll system on a proper amount of money to charge a car for using the roadway. The axles sensors have a finite life and are prohibitively expensive. A toll system without axle sensors is desired.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
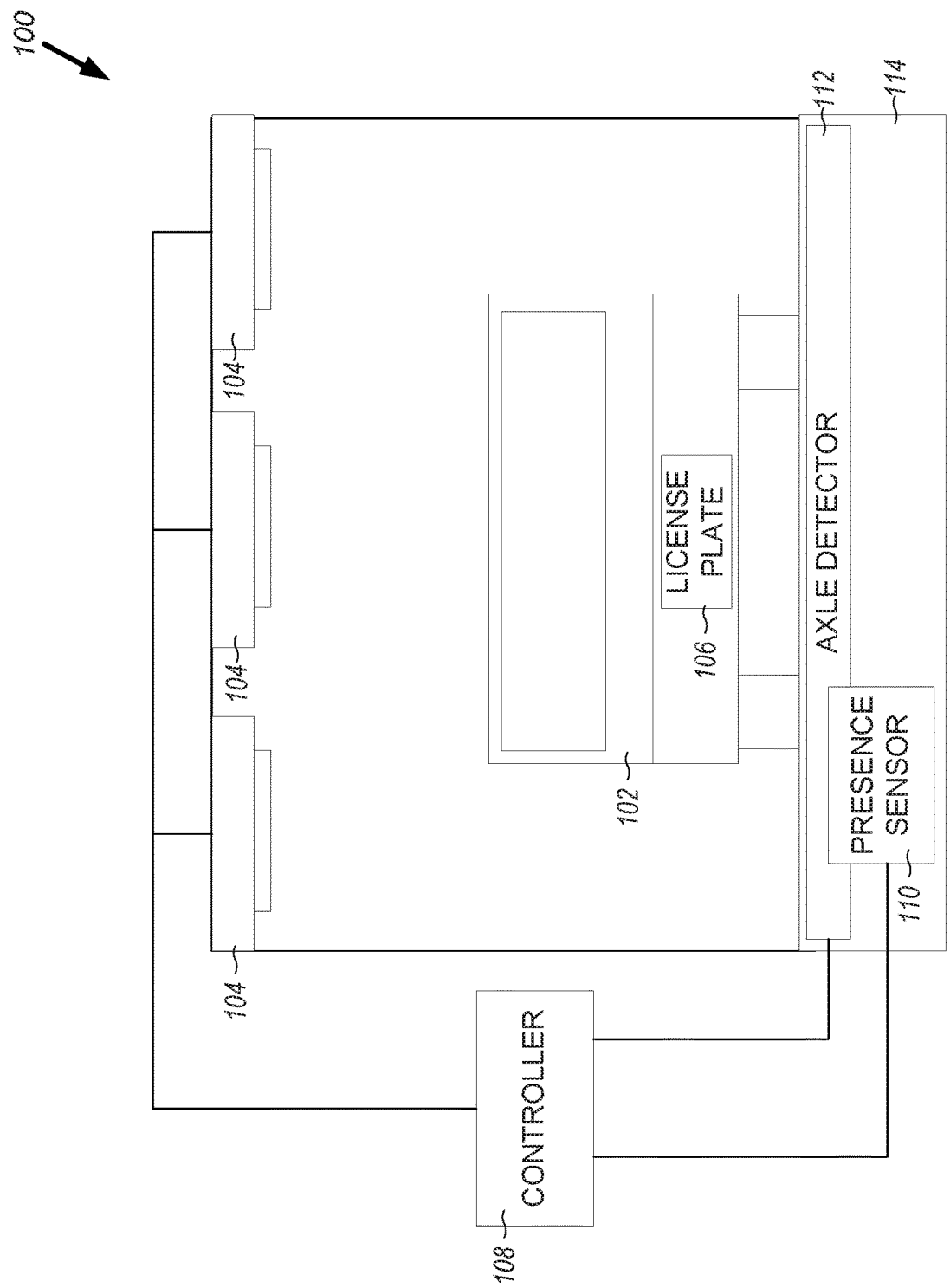
FIG. 1 illustrates, by way of example, a diagram of a prior system for managing tolls.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In prior toll management systems, sensors built into a roadway sense the vehicle presence. The sensor output can trigger a first overhead camera to capture a photo of a front license plate. A radio device on the vehicle can send a signal in search of a transponder of the toll system, which answers and tells the system to charge a toll account of the car owner.

If there is no transponder, the system can take color photos of the vehicle, including front and rear license plates. The photos can be compared to registry records to identify the owner and send a bill. If the driver has a transponder but forgot to bring it, the system takes the plate images, recognizes the vehicle is signed up for automatic tolling and debits the account accordingly.

Ground sensors can follow the vehicle through the toll zone, tracking its movement, triggering a second camera to capture the rear license plate, and telling a special scanner to produce a computerized image of the vehicle's size and shape. A vehicle can change its size and shape during transit—for example, a truck that enters a toll road with a trailer but then drops it at a rest area and continues on with nothing in tow. The ground sensors can even tell when a vehicle changes lanes. If a car enters the toll zone in the right lane but moves to the center lane halfway through, the sensors can tell the cameras the car has moved and that the center-lane camera should take the rear-license plate photo.

The tolling system can learn to read bent or otherwise illegible license plates, with some human help. Plate pictures that the software cannot read can be sent to an image reviewer. The image reviewer uses the readable parts of the plate, combined with the vehicle's make, model and color, to check registry records, identify the car in question and enter the information into an image database of the system. The next time the system sees that plate, it can recognize the owner of the license plate automatically. That technology can also be used to help thwart toll evaders who alter or obscure their plates.

Inductive loops are generally considered a reliable traffic detection method. An inductive loop consists of wire "coiled" to form a loop that usually is a square, circle, or rectangle that is installed into or under the surface of the roadway. Inductive loops are used in signal detection and work like a metal detector. As a vehicle drives over a loop sensor, the loop electromagnetic field changes and allows the detection device to detect the presence of an object (mainly a vehicle). Often Inductive loops are referred to as presence detectors, and in traffic detection are often used in combination with axle sensors (piezo wires across the road) to collect classification data. This sort of old toll system is illustrated in FIG. 1.

FIG. 1 illustrates, by way of example, a diagram of a known toll management system 100. The system 100 as illustrated includes sensors embedded in the road (e.g., an axle detector 112 and a presence sensor 110) and overhead cameras 104 coupled to a controller 108.

The axle detector 112 generates a voltage or current when compressed. The axle detector 112 can include piezoelectric or other similar material that generates a voltage or current when compressed. Weight of a vehicle 102 or a vehicle accessory (e.g., a trailer, a fifth wheel camper, or the like) can compress the axle detector 112. The voltage or current generated by the axle detector 112 can be interpreted by the controller 108 to determine a number of axles present on the vehicle 102. A time between voltage or current generation, an amount of voltage or current generated, or the like, can be used in determining the number of axles.

The presence sensor 110 is typically an inductive coil that generates an electromagnetic field and causes a current or voltage to be provided as an output. The electromagnetic field can change based on a space between coils of the inductive coil. The weight of the vehicle 102 or vehicle accessory can cause the distance between consecutive coils of the presence sensor 110 to change, thus changing the voltage or current produced thereby.

The controller 108 can interpret the current or voltage from the presence sensor 110 to determine whether an object is present on a roadway 114. The controller 108 can cause a camera 104 to generate an image of a front or rear license plate 106 in response to detecting the object. The image can then be used to determine an owner of the vehicle 102 for tolling purposes.

Not only are the axle detector 112 and the presence sensor 110 expensive, they require changes to the roadway 114 for proper operation. The axle detector 112 is typically recessed into a surface of the roadway 114. The presence sensor 110 is usually embedded in the roadway 114. To replace or repair the axle detector 112 or the presence sensor 110, the roadway will need to be closed and possibly partially excavated. This is a very expensive process and can be dangerous for the workers that perform such fixes.

Some of the current challenges for electronic tolling are high installation and operational costs. Two large contributors to these costs are the suite of complex, industrial sensors and the fact that low-confidence license plate reads must undergo manual review. Prior toll systems can benefit from improvements in classification and identification of vehicles in a more cost-effective fashion, while maintaining a high degree of accuracy and precision.

In embodiments, a system can be programmed to use ML and cameras to detect, track, or classify vehicles on the roadway. Such a system provides a cheaper, commercially-available tolling system as an improvement over the system 100. The system can identify an incoming vehicle, create an outline around the vehicle, and then categorize the type of vehicle for tolling purposes (e.g., automatically, such as without human interference after deployment). After the vehicle is identified, best images may be identified. These best images may be utilized, along with one or more other NNs, for optical character recognition (OCR) on the license plate. The goal can be to use passive optical systems and computing resources, replacing the need for more complex sensor systems. This helps to make both installation and maintenance easier and more economical.

In one embodiment, vehicle identification is performed by a system using one or more convolutional neural networks (CNNs) for tracking on road environments. Static images and/or video from optical sources, such as cameras or other video capture devices may be used for detection, tracking, and classification of vehicles on roadways in real time. The images and/or video may be captured passively in some embodiments, without the need for actively controlling cameras (e.g., by altering a direction, angle, focus, or the like of the field of view of the camera). Real time means that the images and/or video is captured and processed contemporaneously, or shortly after a vehicle is within a field of view of one or more capture devices (which sometimes include cameras).

Labeled traffic data, in the form of annotated images may be used to train an ML technique. In some embodiments, preliminary data obtained from Transportation and Support Services may be used to train a toll system. Such data consists of down-stream video and separate file containing classifications with time stamps. In one embodiment, the video is separated into images and bounding boxes, with vehicle class, drawn for each image.

Figure 2:
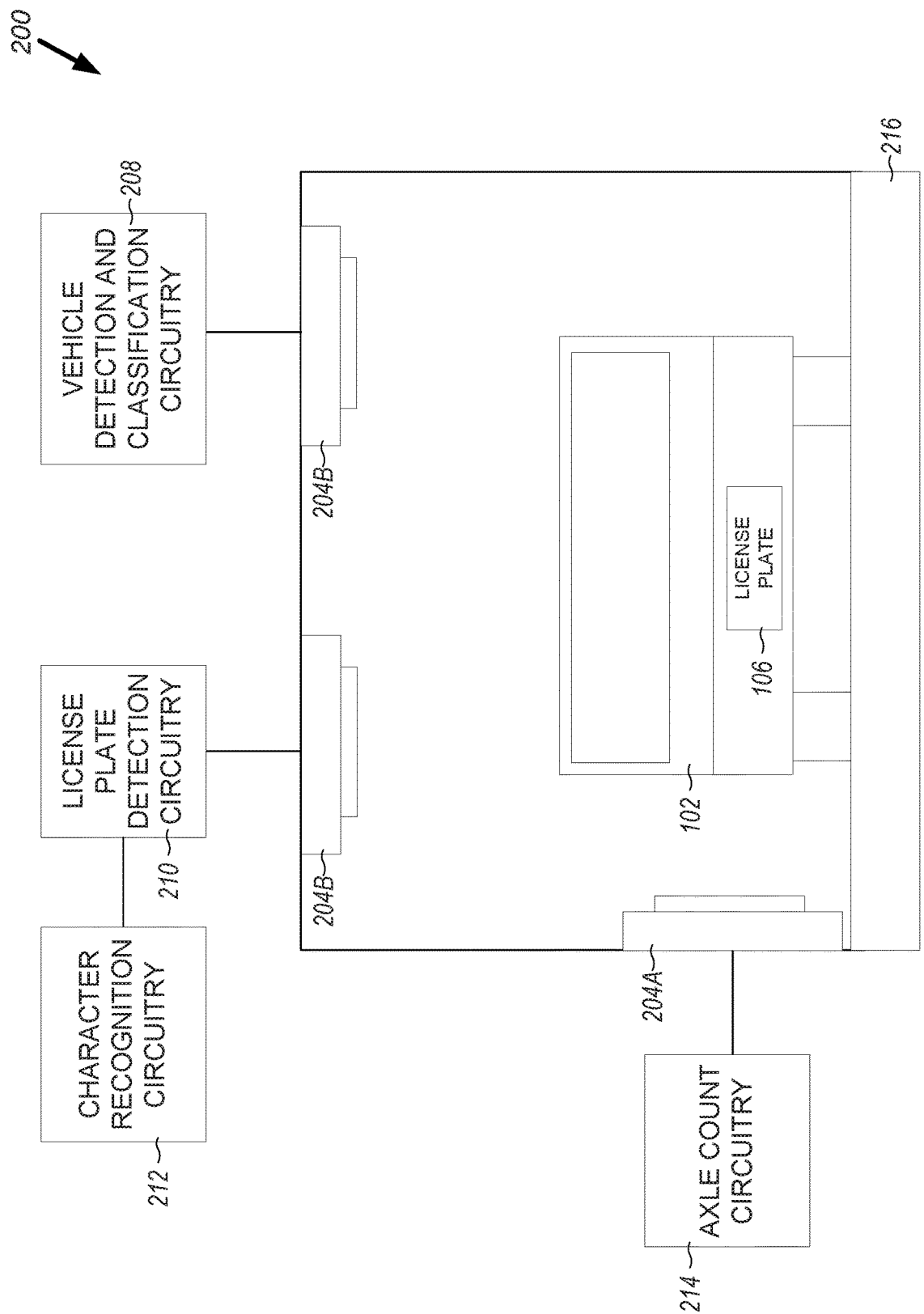
FIG. 2 illustrates, by way of example, a diagram of an embodiment of a system for managing tolls.

FIG. 2 illustrates, by way of example, a diagram of an embodiment of a system 200 for toll management. The system 200 overcomes one or more of the problems with using the system 100. For example, the system 200 does not rely on the axle detector 112 or the presence sensor 110 to detect an object or count the number of axles. Instead, the system 200 uses image analysis to perform the functions of the presence sensor 110 and the axle detector 112.

The system 200 as illustrated includes a roadway 216. The roadway does not include either of the presence sensor 110 or the axle detector 112 embedded therein. Even if the system 200 is deployed at a roadway that includes embedded presence sensor and/or axle detector, such components may simply not be utilized by the system 200 in various embodiments. In some embodiments, the system 200 includes overhead cameras 204B and optional sideview cameras 204A.

At least one of the overhead cameras 204B or the sideview cameras 204A can be communicatively coupled to vehicle detection and classification circuitry 208, license plate detection circuitry 210, or axle count circuitry 214. The license plate detection circuitry 210 can be communicatively coupled to character recognition circuitry 212.

The vehicle detection and classification circuitry 208 can perform the function of the presence sensor 110 among other operations. The vehicle detection and classification circuitry 208 can use a convolutional neural network (CNN) to determine whether the vehicle 102 is present in the roadway 216. The CNN includes an input layer, an output layer, and one or more hidden layers. The CNN can include a rectified linear unit (RELU) layer (or other activation function), a pooling layer, a fully connected layer, or a normalization layer.

The RELU layer filters an input to only positive values (such as by employing a function RELU=max (0, input) or the like. A pooling layer reduces dimensions of data by combining outputs of neuron clusters to a single neuron. Pooling can use an average or a max of the cluster of neurons as representative of the entire cluster. A pooling layer can be inserted to reduce the spatial size of the representation of the input. The pooling layer can reduce the number of parameters and computation in the network, and hence to also control overfitting.

A fully connected layer connects every neuron in one layer to every neuron in another layer. A fully connected layer can be used to classify an image or a portion thereof. The normalization layer applies a transformation that maintains a mean activation of the previous layer around zero and the standard deviation of the activation to about one (1).

The vehicle detection and classification circuitry 208 can receive image data from the camera 204A, 204B and determine whether the vehicle 102 is present in the image data. The vehicle detection and classification circuitry 208 can be trained using pre-labelled images of the various types of vehicles or various attributes of the vehicles that affect an amount charged as a toll for using the roadway 216. The various types of vehicles include a car, small truck, large truck, small van, large van, sport utility vehicle, motorcycle, bus, semi, recreational vehicle (RV), or the like. The various attributes of the vehicles include, for example, whether the vehicle is hauling a trailer, a length of the vehicle, a height of the vehicle, or the like. Additional attributes affecting the toll charge may be considered.

The vehicle detection and classification circuitry 208 can detect that the vehicle 102 is on the roadway 216 (as opposed to a shoulder or otherwise near, but not on the roadway 216), the type of vehicle that is on the roadway 216, and the attributes of the vehicle 102. The toll charge can be based on attributes within in a range of values. For example, vehicles of length in a first range can be charged a first toll, while vehicles of a second, different range of lengths can be charged a second, different toll. Similar charges can be used for vehicle heights. The vehicle detection and classification circuitry 208 can identify the range of lengths or heights or provide a length or height estimate that can be used to determine the range.

In some embodiments, the vehicle detection and classification circuitry 208 can provide a communication to the camera 204A, 204B that causes the camera 204A, 204B to take a picture of the license plate 106. In some other embodiments, the camera 204A, 204B can capture image data at a specified rate (e.g., 25 frames per second (fps), 30 fps, 60 fps, or other rate). Image data from the camera 204A, 204B can be provided to license plate detection circuitry 210. The license plate detection circuitry 210 can execute a neural network (NN) configured to determine whether the license plate 106 is present in the image data. The NN can be similar to the CNN used in the vehicle detection and classification circuitry 208 but trained using images of license plates with various frames, backgrounds, colors, lettering, or the like.

In response to detecting the license plate 106, the license plate detection circuitry 210 can provide the image data with the license plate 106 to character recognition circuitry 212. The character recognition circuitry 212 can be similar to the CNN used in the vehicle detection and classification circuitry 208 or the license plate detection circuitry 210, but trained using images of characters (e.g., letters, numbers, symbols, or other indicia of the license plate 106). The character recognition circuitry 212 can determine the characters of the license plate 106, a state that issued the license plate, or the like using the image data.

In some embodiments, the axle count circuitry 214 can receive a communication from the vehicle detection and classification circuitry 208 that indicates to determine the number of axles of a detected vehicle. In other embodiments the axle count circuitry 214 can operate on a frame on a periodic basis. The axle count circuitry 214 can include a neural network (NN) configured to determine the number of axles present in the image data. In some embodiments, only axles that include wheels that contact the road are counted. The NN can be similar to the CNN used in the vehicle detection and classification circuitry 208 but trained using images of vehicles with various axle counts and labelled according to the number of axles to be counted.

As the axles of the vehicle 102 are not typically in view, the axle count circuitry 214 can infer the number of axles. This inference can be based on the number of tires of the vehicle 102 that are in contact with the roadway 216. However, it can be important that the number of tires is not necessarily considered the number of axles. Consider, for example, an image of a semi hauling vehicle. There are more axles in the image than should be charged for tolling purposes, such as the axles of vehicles being hauled. Consider further, a semi carrying spare tires. The spare tires are not attached to axles for which the tolling system should charge the person responsible for tolling of the semi.

These sorts of issues can be handled in training the NN of the axle count circuitry 214. The training can include images of semis carrying cars, trucks with all-terrain vehicles (ATVs), semis with wheels on and off the ground, vehicles with and without trailers, vehicles with multiple trailers, among other configurations. Each of the images can include a label indicating an accurate number of axles to be counted. Training in this manner can allow the axle count circuitry 214 to learn which tires correspond to axles that are counted, and which tires correspond to axles that are not counted. In some embodiments, tires in contact with the roadway 216 are counted as axles. Thus, the NN can be trained to identify the roadway 216 and count the number of tires touching the roadway 216.

Figure 3:
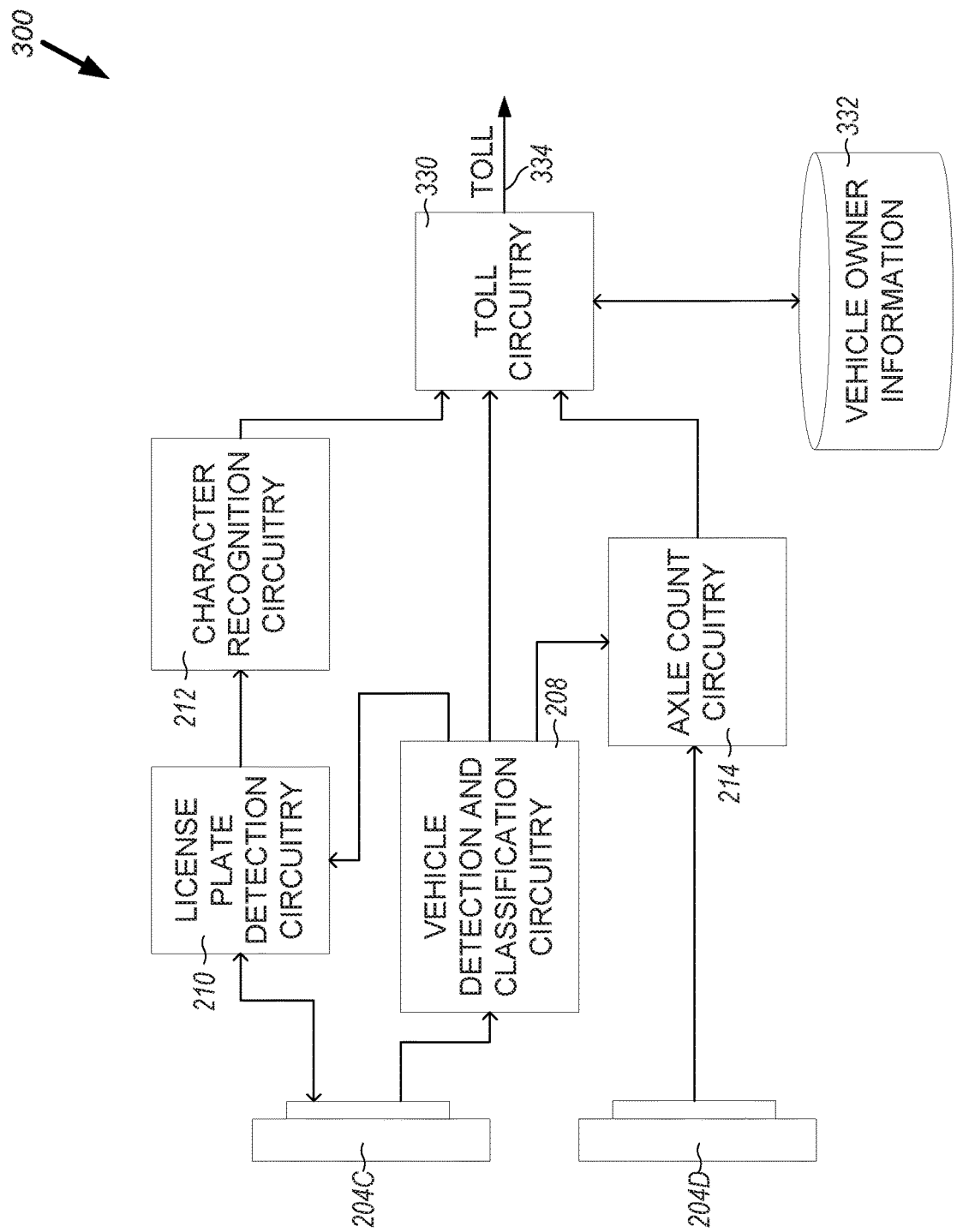
FIG. 3 illustrates, by way of example, a diagram of an embodiment of a system for managing tolls.

FIG. 3 illustrates, by way of example, a diagram of an embodiment of a system 300 for managing tolls. The system 300 as illustrated includes cameras 204C, 204D, the license plate detection circuitry 210, the character recognition circuitry 212, the vehicle detection and classification circuitry 208, the axle count circuitry 214, toll circuitry 330, and a vehicle owner information database 332.

The cameras 204, vehicle detection and classification circuitry 208, license plate detection circuitry 210, character recognition circuitry 212, and axle count circuitry 214 are described regarding FIG. 2. The system 300 of FIG. 3 illustrates more connections between the items of FIG. 2. For example, the camera 204C, either an overhead or sideview camera, can be communicatively coupled to both the vehicle detection and classification circuitry 208 and the license plate detection circuitry 210. The vehicle detection and classification circuitry 208 can detect the vehicle 102 and provide data to the license plate detection circuitry 210 indicating that the vehicle 102 was detected. The license plate detection circuitry 210 can then analyze a subsequent frame from the camera 204C to identify whether the license plate 106 is present in the frame. If the license plate 106 is present in the frame, the frame can be provided to the character recognition circuitry 212. The character recognition circuitry 212 can then operate to recognize the characters of the license plate 106. The recognized characters can be provided to the toll circuitry 330.

In some embodiments the character recognition circuitry 212 or the license plate detection circuitry 210 can classify a state associated with the license plate 106. The state can be indicated in text on the license plate, by different graphics or colors on the license plate, or the like. Many states have multiple different license plate styles and the license plate detection circuitry 210 or the character recognition circuitry 212 can be trained to detect each of the various different license plates.

The vehicle detection and classification circuitry 208 can, in response to detecting the vehicle 102, provide data to the axle count circuitry 214 indicating that the vehicle 102 was detected. The axle count circuitry 214 can then analyze a frame from camera 204D (an overhead or side view camera) to determine the number of axles to be charged to the owner of the vehicle 102. The axle count circuitry 214 can provide the number of axles determined to the toll circuitry 330.

The vehicle detection and classification circuitry 208 can, in addition to determining that a vehicle is present, estimate characteristics of the vehicle 102. The characteristics can be elements of the vehicle that can affect the amount the owner is billed for the toll. The characteristics that do not affect the toll charge can be ignored or not determined by the vehicle detection and classification circuitry 208. For example, if a height of the vehicle 102 is not used in determining, by the toll circuitry 330, the amount charged for use of the roadway 216, then the vehicle detection and classification circuitry 208 need not classify the height of the vehicle 102 or the toll circuitry 330 can ignore the height. This makes the system 300 flexible in its application.

The toll circuitry 330 can use the recognized characters from the character recognition circuitry 212 to identify an owner of the vehicle 102 that is to be billed for a determined toll 334. The toll circuitry 330 can issue a query to the vehicle owner information database 332 including the recognized characters from the character recognition circuitry 212. The vehicle owner information database 332 can include data including license plate numbers, a corresponding state associated with the license plate number, an address (e.g., a physical address, electronic mail address, or the like) to which to send a bill for the toll 334, an account number of the owner associated with the license plate 106, or the like. Data indicating an owner of the vehicle, an address of the owner, an account number of the owner, or other information in the vehicle owner information database 332 can be provided to the toll circuitry 330 in response to the query. If the license plate number (e.g., for a corresponding identified state) is not in the vehicle owner information database 332, the toll circuitry 330 can provide the image of the license plate, the characters recognized by the character recognition circuitry 212, the image of the vehicle 102 from either a side view, overhead view, or both, or the like, to a human analyst. The human analyst can then determine who to bill or where to send the bill from the toll 334.

The toll circuitry 330 can determine, based on a heuristic, an amount to charge for the toll 334. The heuristic can account for one or more of the characteristics provided by the vehicle detection and classification circuitry 208, the axle count from the axle count circuitry 214, a time of day, whether the vehicle 102 has a pass (e.g., a radio frequency (RF) tag that indicates the vehicle 102 has access privileges, reduced toll rates, or the like), or the like. For example, the toll 334 can be a different amount for each number of axles in the range [2, 6], a different amount for a motorcycle (as can be determined by the vehicle detection and classification circuitry 208), a different amount for vehicles over a specified height, a different amount for vehicles greater than a specified length (e.g., with or without trailer), a different amount for each category at different times of day, or the like.

The system 200, 300 may replace the need for active sensors of different types by using neural networks to identify types of vehicles and vehicle characteristics. The system 200, 300 can reduce the cost and complexity of prior sensor or human based systems of determining tolls for vehicles without the need for specialized hardware. Deep learning networks may be used to replace the need for active systems, making maintenance and installation cheaper than prior systems. Identified license plates and vehicle specification data may be stored in the vehicle owner information database 332 and probed or data mined for further analytics.

In one embodiment, the system 200, 300 is an all passive system with inexpensive commercial hardware combined with one or more deep learning NNs (e.g., executed by the license plate detection circuitry 210, character recognition circuitry 212, vehicle detection and classification circuitry 208, or axle count circuitry 214). The NN may be trained by mounting the camera 204 to existing infrastructure, making a dataset of information easily collectible. With the system 200, 300 in place, the system 200, 300 may constantly be using the data collected for enhancement, while also archiving the information for other tasks. The NN implemented by any of the license plate detection circuitry 210, character recognition circuitry 212, vehicle detection and classification circuitry 208, or axle count circuitry 214 may be trained offline using the data collected. The NN implemented by any of the license plate detection circuitry 210, character recognition circuitry 212, vehicle detection and classification circuitry 208, or axle count circuitry 214 can include a YOLO (you only look once) CNN.

In some embodiments, the vehicle 102 can be tracked. Tracking the vehicle 102 can help the camera 204 capture higher quality images of the license plate 106 for automated plate recognition by the license plate detection circuitry 210 or the character recognition circuitry 212 that has been trained on text recognition, or even license plate images. In some embodiments, multiple cameras 204 spanning different light spectra (e.g., infrared, visible light, night vision, or the like) may be used to ensure sufficient illumination of the target vehicles for accurate classification.

The system 200, 300 attains high identifications/classification confidence scores when sufficient quantity and quality of training data has been used. The data collected at an existing toll area with one or more cameras in place may be labeled and used to train the system in one embodiment. After training, the NNs can operate quickly and with low resource overhead. Installation cost can be cut by utilizing affordable commercial off the shelf (COTS) hardware.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

In one embodiment, training may be performed by annotating actual captured images in a toll collection setting with labels during use of previous systems in preparation for fully automated toll collection utilizing the system 200, 300.

Artificial intelligence (AI) is a field concerned with developing decision-making systems to perform cognitive tasks that have traditionally required a living actor, such as a person. NNs are computational structures that are loosely modeled on biological neurons. Generally, NNs encode information (e.g., data or decision making) via weighted connections (e.g., synapses) between nodes (e.g., neurons). Modern NNs are foundational to many AI applications, such as automated perception (e.g., computer vision, speech recognition, contextual awareness, etc.), automated cognition (e.g., decision-making, logistics, routing, supply chain optimization, etc.), automated control (e.g., autonomous cars, drones, robots, etc.), among others.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The correct operation of most NNs relies on correct weights. However, NN designers do not generally know which weights will work for a given application. Instead, a training process is used to arrive at appropriate weights. NN designers typically choose a number of neuron layers or specific connections between layers including circular connection, but the NN designer does not generally know which weights will work for a given application. Instead, a training process generally proceeds by selecting initial weights, which may be randomly selected. Training data is fed into the NN and results are compared to an objective function that provides an indication of error. The error indication is a measure of how wrong the NN's result was compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs.

Figure 4:
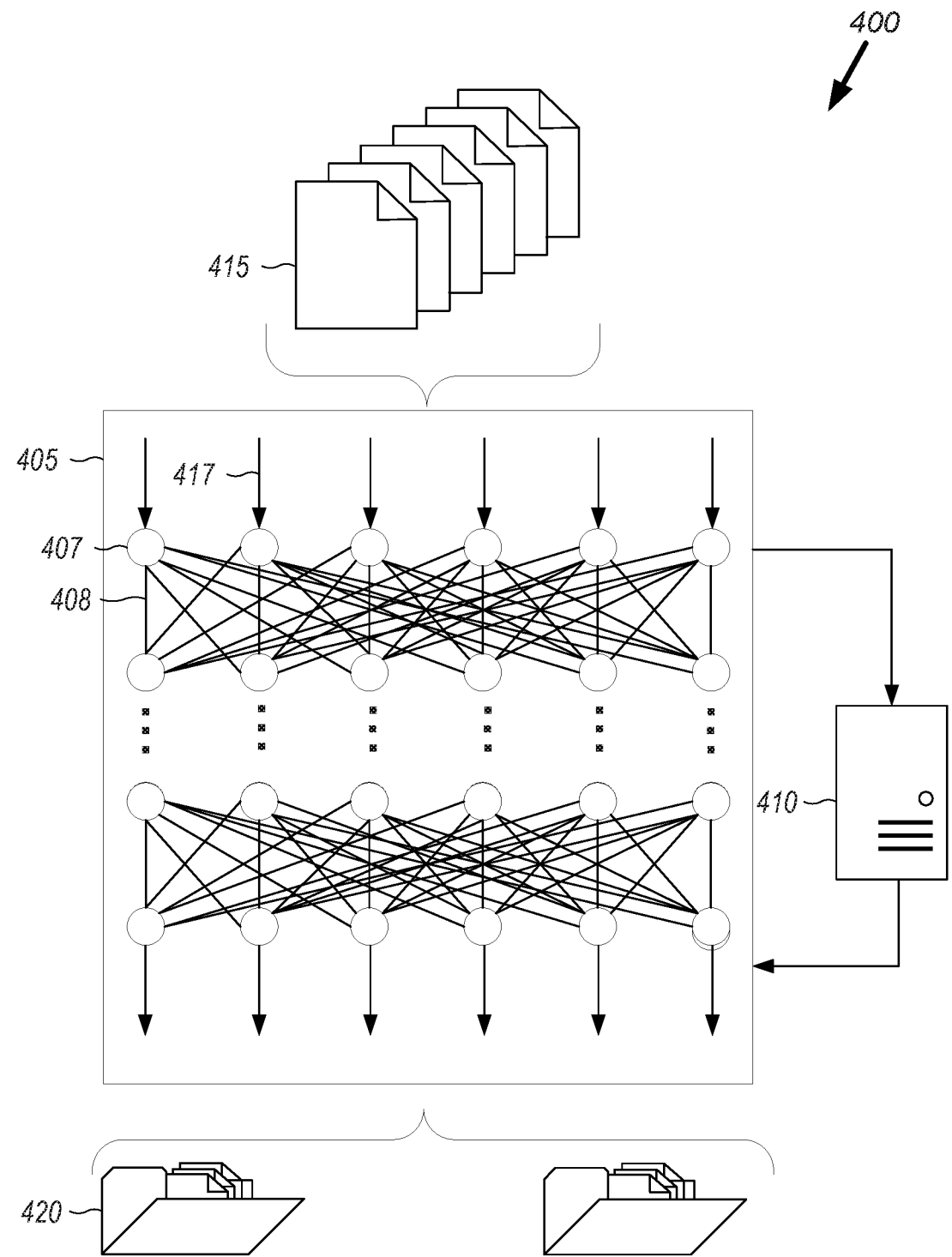
FIG. 4 illustrates, by way of example, a diagram of an embodiment of an environment for neural network training.

FIG. 4 is a block diagram of an example of an environment including a system for NN training, according to an embodiment. The system includes an NN 405 that is trained using a processing node 410. The processing node 410 may include a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the NN 405, or even different nodes 407 within layers. Thus, a set of processing nodes 410 can be arranged to perform the training of the NN 405.

The set of processing nodes 410 can be arranged to receive a training set 415 for the NN 405. The NN 405 comprises a set of nodes 407 arranged in layers (illustrated as rows of nodes 407) and a set of inter-node weights 408 (e.g., parameters) between nodes in the set of nodes 407. In an example, the training set 415 is a subset of a complete training set. Here, the subset may enable processing nodes with limited storage resources to participate in training the NN 405.

The training data may include multiple numerical values representative of a domain, such as red, green, and blue pixel values and intensity values for an image. Each value of the training or input data 417 to be classified after the NN 405 is trained, is provided to a corresponding node 407 in the first layer or input layer of the NN 405. The values propagate through the layers and are changed by the objective function.

As noted above, the set of processing nodes is arranged to train the NN to create a trained NN. Once trained, data input into the NN will produce classifications 420 (e.g., the input data 417 will be assigned into categories), for example. The training performed by the set of processing nodes 407 is iterative. In an example, each iteration of the training the NN can be performed independently between layers of the NN 405. Thus, two distinct layers may be processed in parallel by different members of the set of processing nodes. In an example, different layers of the NN 405 can be trained on different hardware. The members of different members of the set of processing nodes may be located in different packages, housings, computers, cloud-based resources, or the like. In an example, each iteration of the training is performed independently between nodes in the set of nodes. This example is an additional parallelization whereby individual nodes 407 (e.g., neurons) are trained independently. In an example, the nodes are trained on different hardware.

Figure 5:
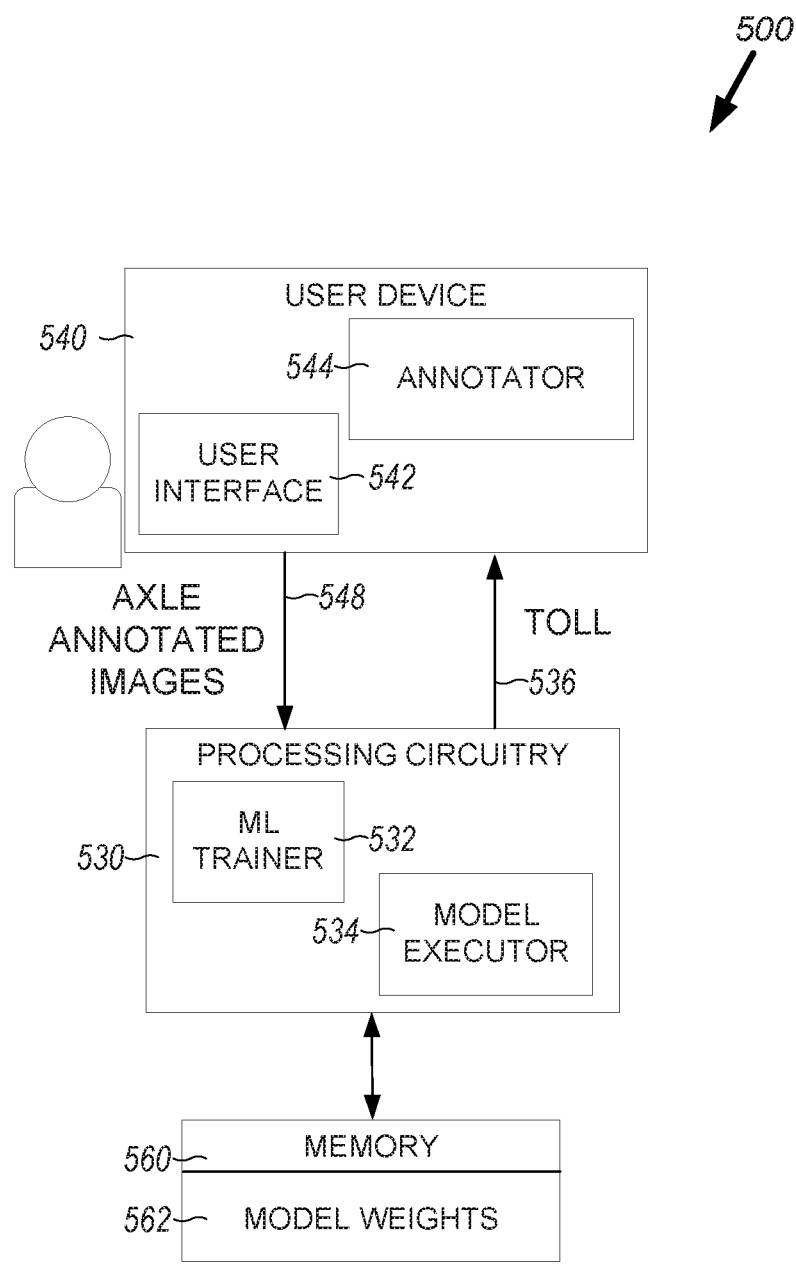
FIG. 5 illustrates, by way of example, a diagram of an embodiment of a system for ML model generation and execution.

FIG. 5 illustrates, by way of example, a diagram of an embodiment of a system 500 for ML training and execution for tolling purposes. The system 500 as illustrated includes a user device 540, processing circuitry 550, and a memory 560. The user device 540 provides the user with functionality of an annotation application 544 through a user interface 542. The user device 540 may include a smartphone, laptop computer, desktop computer, tablet, phablet, e-reader, or the like that is capable of providing the functionality of the annotation application 544.

The user interface 542 receives signals from an input device controlled by the user. The user interface 542 interprets the signals and causes the annotation application 544 to associate an annotation with an image or a portion thereof based on the signals.

The annotation application 544 is an application through which the user classifies a number of axles of a vehicle in an image. An axle annotated image 548 can be provided to the memory 560 or processing circuitry 530 for training an ML model, such as using ML trainer 532.

The axle annotated image 548 may be provided to the processing circuitry 550. The processing circuitry 530 includes hardware, software, or firmware configured to train an ML model to identify a number of axles to count for tolling purposes. Hardware may include one or more electric or electronic components configured to perform one or more operations of the processing circuitry 530. The electric or electronic components may include one or more transistors, resistors, capacitors, diodes, inductors, analog to digital converters, digital to analog converters, rectifiers, power supplies, logic gates (e.g., AND, OR, XOR, negate, buffer, or the like), switches, oscillators, modulators, demodulators, relays, antennas, phase-looked-loops, amplifiers, central processing units (CPUs), graphics processing units (GPUs), application specific integrated circuits (ASICs), field programmable gate arrays (FPGAs), or the like.

The processing circuitry 530 as illustrated includes the ML trainer 532 and a model executor 534. The ML trainer 532 operates to determine weights 562 of an ML model to be executed by the model executor 534. The ML trainer 532 may operate in a supervised manner, such as by predicting an output for a given input and comparing the predicted output (classification) to a known output. A loss function may indicate how to change the weights of the ML model to make a better prediction on future data. The ML trainer 532 may be configured to train one or more of the ML models of the vehicle detection and classification circuitry 208, the license plate detection circuitry 210, the character recognition circuitry 212, or the axle count circuitry 214.

The processing circuitry 530, while illustrated as being separate from the user device 540, may be a part of the user device 540 in some embodiments. In some other embodiments, the processing circuitry 530 may be part of a different computing device or devices. In some embodiments, the processing circuitry 530 is part of the cloud or is provided as a service through the Internet or other network. While the processing circuitry 530 illustrates the ML trainer 532 and the model executor 534 as part of the same device, they may be on different devices. For example, the ML trainer 532 may be implemented in the cloud, while the model executor 534 may be implemented on the user device 540.

The weights 562 may be provided to the memory 560 for future access by the model executor 534. The model executor 534 may retrieve the weights 562 and implement the model using the weights 562. The model can classify a number of axles, a type of vehicle, one or more characteristics of the vehicle, whether a license plate is present in an image, content of the license plate, or the like. The processing circuitry 530 can generate a toll charge 536 based on the information generated from model execution.

Figure 6:
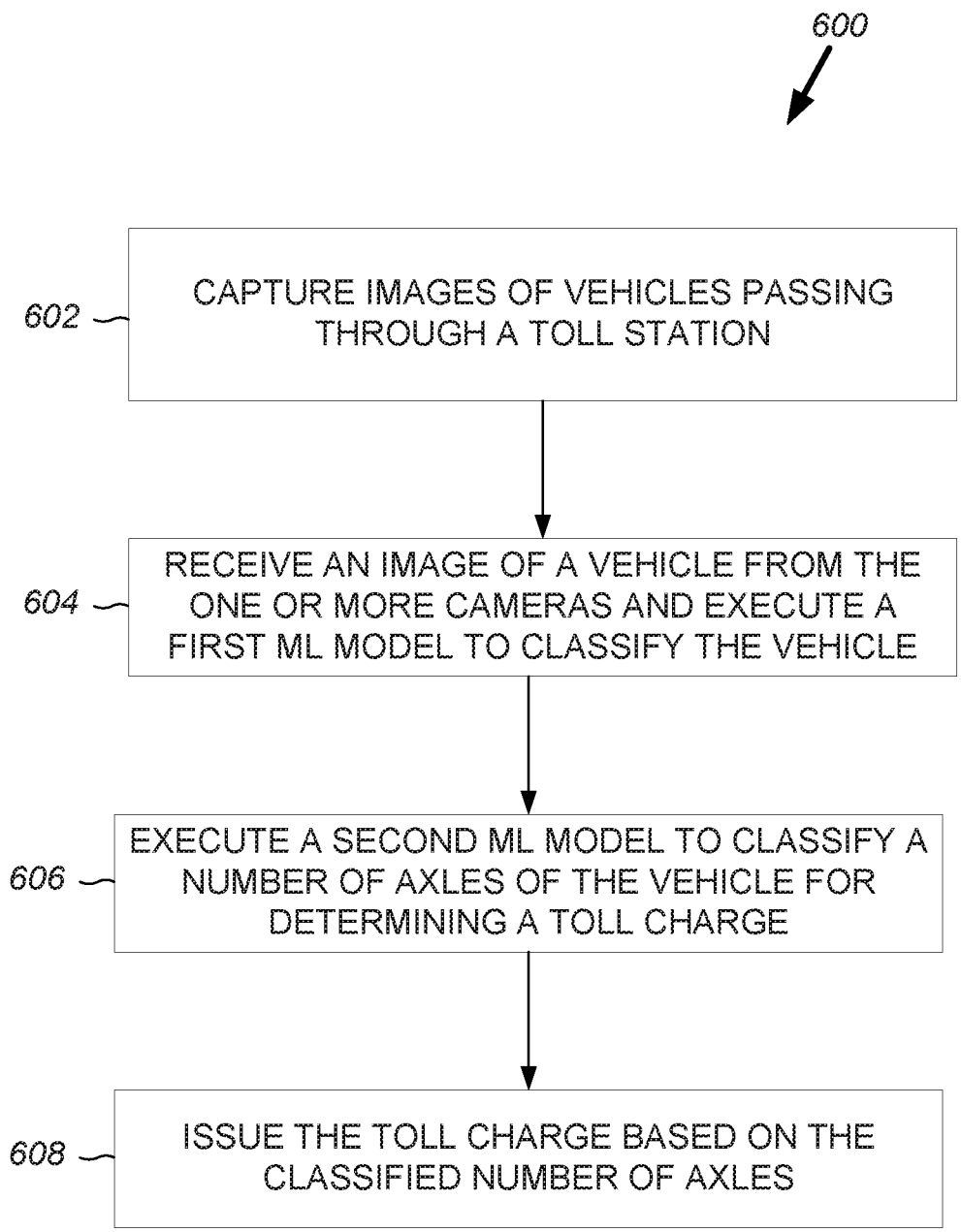
FIG. 6 illustrates, by way of example, a diagram of an embodiment of a method for managing tolls.

FIG. 6 illustrates, by way of example, a diagram of an embodiment of a method 600 for toll issuance. The method 600 as illustrated includes capturing (by one or more cameras 204) images of vehicles passing through a toll station, at operation 602; receiving (by vehicle detection and classification circuitry 208) an image of a vehicle from the one or more cameras and execute a first machine learning (ML) model to classify the vehicle, at operation 604; executing (by axle count circuitry 214) in response to receiving data from the vehicle detection and classification circuitry that a vehicle was detected, a second ML model to classify a number of axles of the vehicle for determining a toll charge, at operation 606; and issuing (by toll circuitry 330) the toll charge based on the classified number of axles, at operation 608.

The method 600 can further include executing (by license plate detection circuitry 210) a third ML model to identify a license plate in an image of the captured images. The method 600 can further include executing (by character recognition circuitry 212) a fourth ML model to identify a license plate number on the license plate. The method 600 can further include providing (by the character recognition circuitry 212) the license plate number to the toll circuitry 330. The method 600 can further include issuing (by the toll circuitry 330) the toll charge to an owner of the vehicle as determined further based on the license plate number.

The method 600 can further include issuing (by the toll circuitry 330) a query including the identified license plate number to a vehicle owner information database and information identifying the owner of the vehicle is provided to the toll circuitry 330 in response to the query. The method 600 can further include retrieving (by the license plate detection circuitry 210) an image (captured by the one or more cameras 204) in response to receiving data (from the vehicle detection and classification circuitry 208) indicating the vehicle was detected. The method 600 can further include classifying (by the vehicle detection and classification circuitry 208) a height, length, or type of the detected vehicle, wherein the type includes a car, motorcycle, or truck.

Example Machine Architecture and Machine-Readable Medium (e.g., Storage Device)

Figure 7:
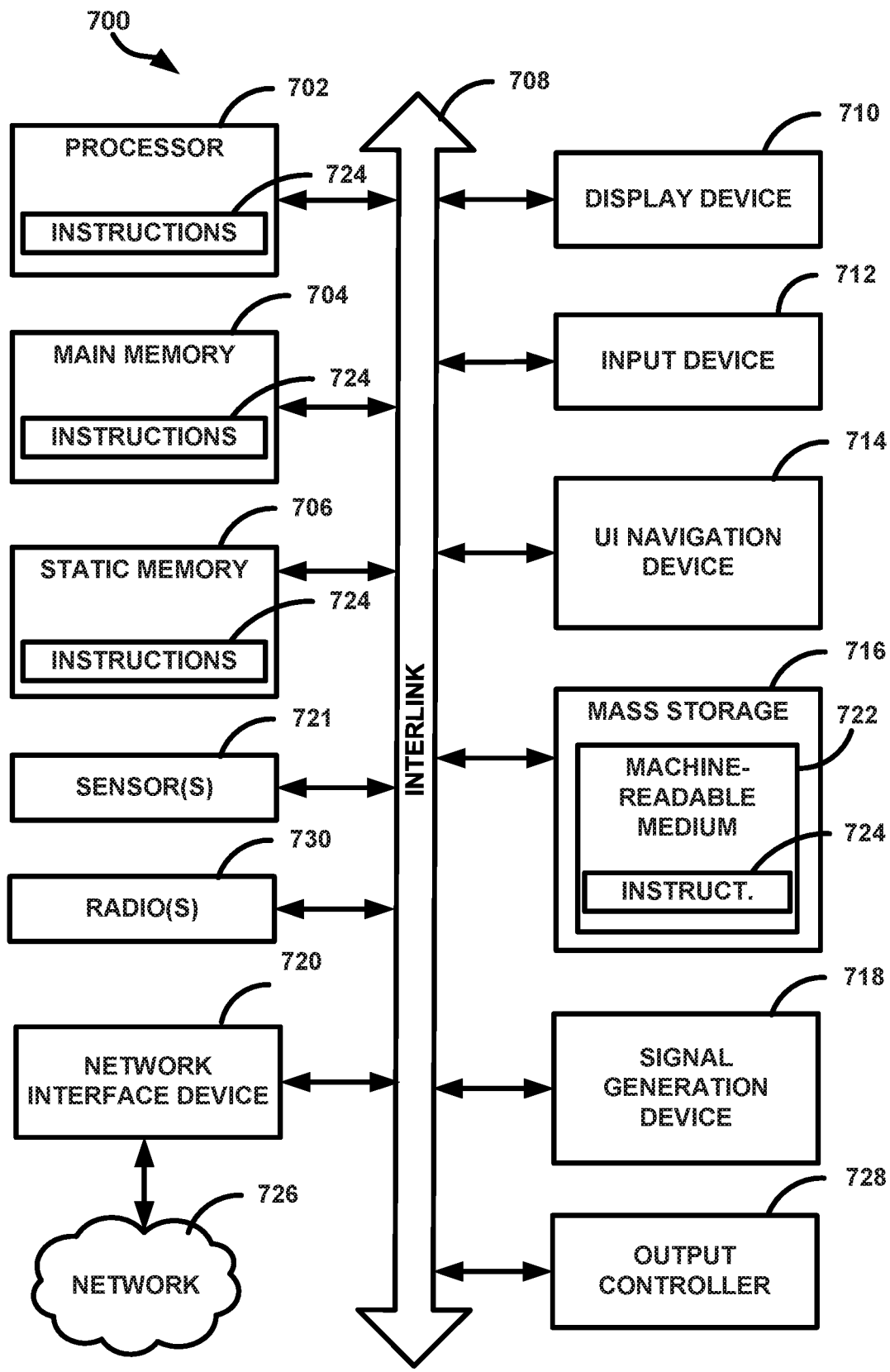
FIG. 7 illustrates, by way of example, a block diagram of an embodiment of a machine in the example form of a computer system within which instructions, for causing the machine to perform any one or more of the methodologies discussed herein, may be executed.

FIG. 7 illustrates, by way of example, a block diagram of an embodiment of a machine in the example form of a computer system 700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., processing circuitry, such as can include a CPU, GPU, FPGA, other circuitry, such as one or more transistors, resistors, capacitors, inductors, diodes, regulators, switches, multiplexers, power devices, logic gates (e.g., AND, OR, XOR, negate, etc.), buffers, memory devices, or the like, or a combination thereof), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker), a network interface device 720, and radios 730 such as Bluetooth, WWAN, WLAN, and NFC, permitting the application of security controls on such protocols.

Machine-Readable Medium

The disk drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system comprising:
   one or more cameras positioned to capture images of vehicles passing through a toll station;
   vehicle detection and classification circuitry to receive an image of a vehicle from the one or more cameras and execute a first machine learning (ML) model to detect a vehicle is present in the received image, classify the detected vehicle based on the received image, and provide data indicating a vehicle is detected;
   axle count circuitry to, in response to receiving the data from the vehicle detection and classification circuitry that the vehicle was detected, execute a second ML model on the received image to classify a number of axles of the vehicle for determining a toll charge; and
   toll circuitry to issue the toll charge based on the classified number of axles.

2. The system of claim 1 further comprising license plate detection circuitry to execute a third MT model to identify a license plate in an image of the captured images.

3. The system of claim 2, further comprising character recognition circuitry to execute a fourth ML model to identify a license plate number on the license plate.

4. The system of claim 3, wherein:
   the character recognition circuitry is further to provide the license plate number to the toll circuitry; and
   the toll circuitry is to issue the toll charge to an owner of the vehicle as determined further based on the license plate number.

5. The system of claim 4, wherein the toll circuitry is to issue a query including the identified license plate number to a vehicle owner information database and receive data identifying the owner of the vehicle is provided to the toll circuitry in response to the query.

6. The system of claim 2, wherein the license plate detection circuitry is to retrieve an image captured by the one or more cameras in response to receiving data from the vehicle detection and classification circuitry indicating the vehicle was detected.

7. The system of claim 1, wherein the vehicle detection and classification circuitry is further to classify a height, length, or type of the detected vehicle, wherein the type includes a car, motorcycle, or truck.

8. The system of claim 3, wherein the first, second, third, and fourth ML, models include convolutional neural networks.

9. A method for issuing a toll charge, the method comprising:
   capturing, by one or more cameras, images of vehicles passing through a toll station;
   receiving, by vehicle detection and classification circuitry, an image of a vehicle from the one or more cameras and execute a first machine learning (ML) model to detect a vehicle is present in the received image, classify the detected vehicle based on the received image;
   providing, by the vehicle detection and classification circuitry, data indicating a vehicle is detected;
   executing, by axle count circuitry and in response to receiving the data, from the vehicle detection and classification circuitry, indicating that the vehicle was detected, a second ML, model on the received image to classify a number of axles of the vehicle for determining a toll charge; and
   issuing, by toll circuitry, the toll charge based on the classified number of axles.

10. The method of claim 1 further comprising executing, by license plate detection circuitry, a third ML model to identify a license plate in an image of the captured images.

11. The method of claim 10, further comprising executing, by character recognition circuitry, a fourth ML model to identify a license plate number on the license plate.

12. The method of claim 11, further comprising:
    providing, by the character recognition circuitry, the license plate number to the toll circuitry; and
    issuing, by the toll circuitry, the toll charge to an owner of the vehicle as determined further based on the license plate number.

13. The method of claim 12, further comprising issuing, by the toll circuitry, a query including the identified license plate number to a vehicle owner information database and information identifying the owner of the vehicle is provided to the toll circuitry in response to the query.

14. The method of claim 10, further comprising retrieving, by the license plate detection circuitry, an image captured by the one or more cameras in response to receiving data from the vehicle detection and classification circuitry indicating the vehicle was detected.

15. The method of claim 9, further comprising classifying, by the vehicle detection and classification circuitry, a height, length, or type of the detected vehicle, wherein the type includes a car, motorcycle, or truck.

16. A non-transitory machine-readable medium including instructions that, when executed by a machine, cause the machine to perform operations for improved automatic toll generation, the operations comprising:
    receiving an image of a vehicle from the one or more cameras and execute a first machine learning (ML) model to detect a vehicle is present in the received image, and classify the detected vehicle based on the received image, and provide data indicating a vehicle is detected;

executing, in response to receiving the data indicating that the vehicle was detected, a second ML model on the received image to classify a number of axles of the vehicle for determining a toll charge; and issuing the toll charge based on the classified number of axles.

17. The non-transitory machine-readable medium of claim 16, wherein the operations further comprise executing a third ML model to identify a license plate in an image of the captured images.

18. The non-transitory machine-readable medium of claim 17, wherein the operations further comprise executing a fourth ML model to identify a license plate number on the license plate number.

19. The non-transitory machine-readable medium of claim 18, wherein the operations further comprise:

providing the license plate number to the toll circuitry; and issuing the toll charge to an owner of the vehicle as determined further based on the license plate number.

20. The non-transitory machine-readable medium of claim 18, wherein the first, second, third, and fourth ML models include convolutional neural networks.

\* \* \* \* \*